(12) United States Patent
Swisher

(10) Patent No.: US 8,671,612 B1
(45) Date of Patent: Mar. 18, 2014

(54) QUICK RELEASE LOCKING ASSEMBLIES

(75) Inventor: Anthony E. Swisher, Waskom, TX (US)

(73) Assignee: Anthony Swisher, Waskom, TX (US)

( * ) Notice: Subject to any disclaimer, the term of this patent is extended or adjusted under 35 U.S.C. 154(b) by 128 days.

(21) Appl. No.: 12/802,990

(22) Filed: Jun. 17, 2010

(51) Int. Cl.
 *A01K 91/04* (2006.01)
(52) U.S. Cl.
 USPC .......... 43/42.09; 43/42.49; 43/44.83; 24/635; 24/676; 24/672; 24/704.1; 403/315; 403/316; 403/326; 403/165; 403/154
(58) Field of Classification Search
 USPC ........... 43/42.09, 42.49, 44.83; 403/239, 315, 403/316, 326–328, 165, 154, 252; 24/635, 24/665, 672, 676, 704.1
 IPC ................................ A01K 91/03,91/04, 85/00
 See application file for complete search history.

(56) References Cited

U.S. PATENT DOCUMENTS

| | | | | |
|---|---|---|---|---|
| 2,420,060 A | * | 5/1947 | Adams ........................... | 248/501 |
| 2,688,173 A | * | 9/1954 | Van Peet ....................... | 24/704.1 |
| 2,896,287 A | * | 7/1959 | Stultz .............................. | 24/671 |
| 3,009,279 A | * | 11/1961 | Jacobson ..................... | 43/42.09 |
| 4,112,608 A | * | 9/1978 | McGahee .................... | 43/42.09 |
| 4,164,986 A | * | 8/1979 | Eloy et al. ....................... | 180/90 |
| 4,807,387 A | | 2/1989 | Dougherty, Jr. et al. | |
| 5,113,608 A | | 5/1992 | Hook | |
| 5,221,154 A | * | 6/1993 | Foulquier et al. ............... | 403/12 |
| 5,299,379 A | * | 4/1994 | Hawk ............................ | 43/42.49 |
| 5,410,785 A | * | 5/1995 | Huang ............................ | 24/635 |
| 6,234,706 B1 | * | 5/2001 | Hodzic ......................... | 403/252 |
| 6,393,756 B1 | * | 5/2002 | Forney et al. ................ | 43/42.06 |
| 6,516,552 B2 | | 2/2003 | Hawkins | |
| 2002/0121043 A1 | | 9/2002 | Hawkins | |
| 2006/0236588 A1 | | 10/2006 | Rapelje | |
| 2008/0222939 A1 | | 9/2008 | Smith et al. | |
| 2009/0090039 A1 | | 4/2009 | Ross | |
| 2010/0024277 A1 | | 2/2010 | Ross | |

* cited by examiner

*Primary Examiner* — Darren W Ark
*Assistant Examiner* — Thien Thanh Pham
(74) *Attorney, Agent, or Firm* — Sheridan Ross PC

(57) ABSTRACT

A quick release locking assembly includes at least one lock conduit having a lock conduit interior, at least one release conduit having a release conduit interior and a lock spring having at least one spring arm communicating with the lock conduit interior of the lock conduit and the release conduit interior of the release conduit.

21 Claims, 10 Drawing Sheets

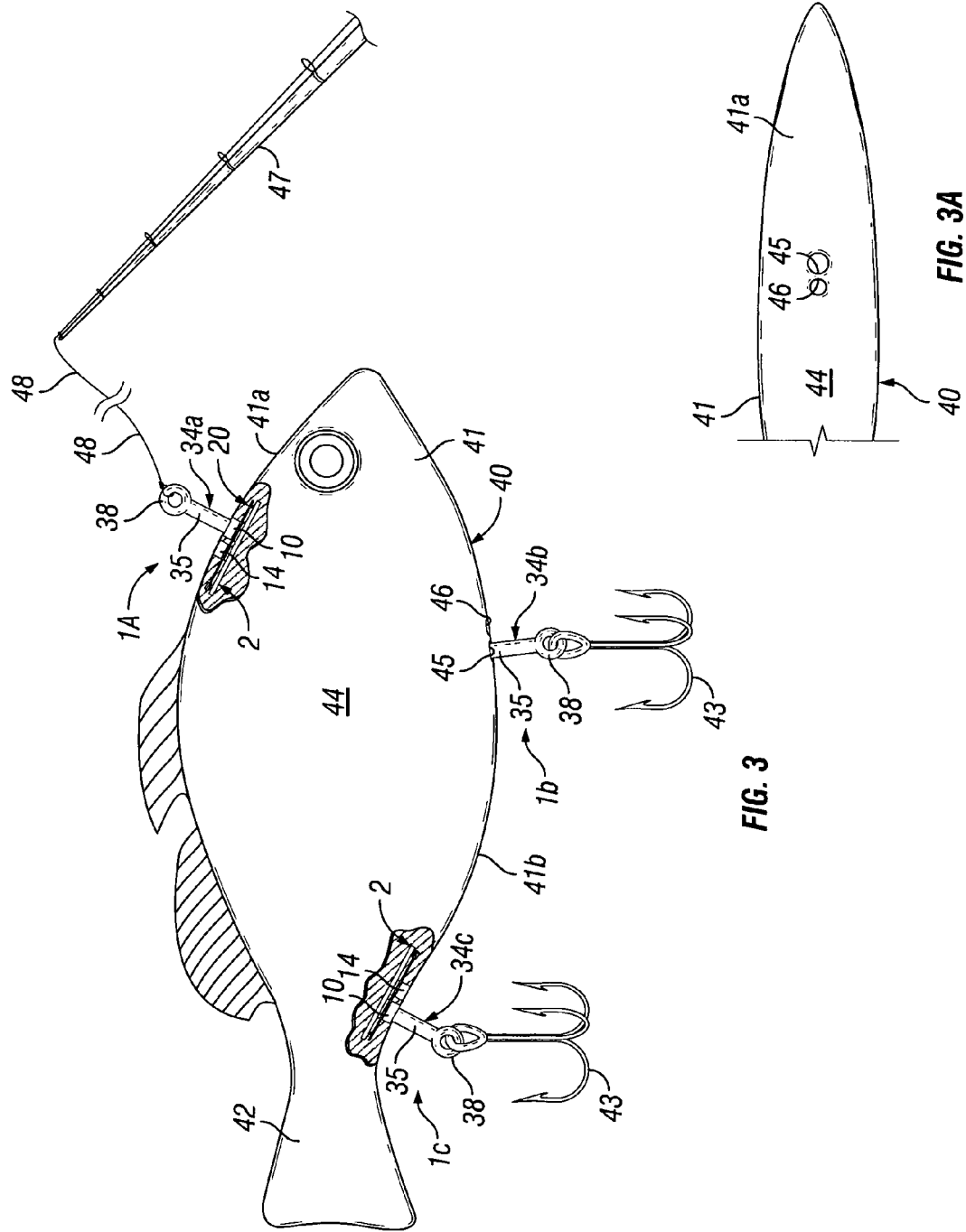

QUICK RELEASE LOCKING ASSEMBLIES

FIELD

The disclosure generally relates to quick release connectors and the like for detachably fastening a first structural element to a second structural element. More particularly, the disclosure relates to quick release locking assemblies which in some exemplary applications detachably fasten at least one attachment such as a fishing line, fishing hook or the like to a fishing lure in an expeditious manner.

BACKGROUND

Fishing lures typically have a hard or soft plastic body which is shaped in the configuration of a worm, frog, crawfish or other water creature and is tied to a fishing line that extends from a fishing pole. The fishing line may be wound on a crank-operated reel which is provided on the fishing pole to facilitate casting of the fishing lure into a lake or other water body and retrieval of the fishing lure through or across the surface of the water body. A fishing lure having a particular size, shape, color and appearance may be selected for attachment to the fishing line to attract fish of a desired type during retrieval of the lure. Connectors such as eye hooks or the like may be provided on the surface of the body of the lure to secure various attachments such as a fishing line, fishing hooks or spinners to the lure.

Eye hooks and other connectors which secure attachments to a fishing lure are typically embedded in and protrude from the surface of the hard or soft plastic body of the lure. Each connector may be dedicated to securing a particular attachment to the lure. Moreover, the attachments are typically permanently attached to the connectors and therefore, cannot be readily detached from the connectors and interchanged with other attachments of different sizes or types as may be desirable in some applications.

Therefore, quick release locking assemblies which in some exemplary applications can be used to detachably fasten one or more attachments such as a fishing line, spinner, fishing hook or the like to a fishing lure in an expeditious manner are needed.

SUMMARY

The disclosure is generally directed to quick release locking assemblies. An illustrative embodiment of the quick release locking assemblies includes a lock conduit having a lock conduit interior, a release conduit having a release conduit interior and a flexible lock spring having at least one spring arm extending through the lock conduit interior of the lock conduit and the release conduit interior of the release conduit.

In some embodiments, the quick release locking assemblies may include a spring support; a lock conduit having a lock conduit interior carried by the spring support; a release conduit having a release conduit interior carried by the spring support in generally adjacent, spaced-apart relationship with respect to the lock conduit; a spring mount peg carried by the spring support; and a flexible lock spring having a spring loop carried by the spring mount peg and a pair of generally elongated, spaced-apart spring arms extending from the spring loop and disposed in generally parallel relationship to the spring support and extending transversely through the lock conduit interior of the lock conduit and the release conduit interior of the release conduit.

The disclosure is further generally directed to a fishing lure. An illustrative embodiment of the fishing lure includes a fishing lure body and at least one quick release locking assembly carried by the fishing lure body and having a lock conduit having a lock conduit interior carried by the fishing lure body, a release conduit having a release conduit interior carried by the fishing lure body and a flexible lock spring having at least one spring arm extending through the lock conduit interior of the lock conduit and the release conduit interior of the release conduit.

BRIEF DESCRIPTION OF THE DRAWINGS

The disclosure will now be made, by way of example, with reference to the accompanying drawings, in which:

FIG. 3 is a side view, partially in section, of a fishing lure, with multiple quick release locking assemblies provided on the surface of the fishing lure and a fishing line and fishing hooks attached to the respective quick release locking assemblies;

FIG. 3A is a top view, partially in section, of the fishing lure illustrated in FIG. 3, with a surface lock opening and a surface release opening provided in the surface of the fishing lure;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
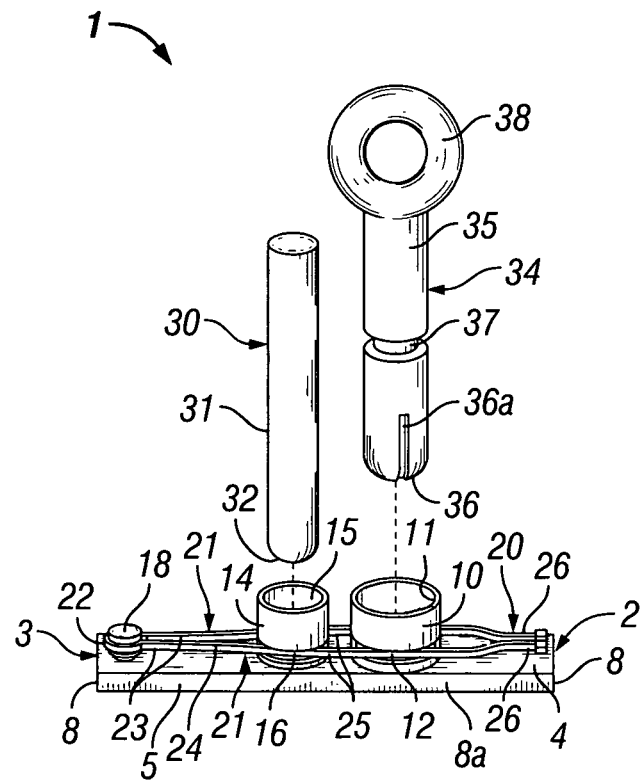
FIG. 1 is an exploded perspective view of an illustrative embodiment of the quick release locking assemblies, more particularly illustrating insertion of an eye hook into a lock conduit and insertion of a release tool into a release conduit of the quick release locking assembly in exemplary application of the quick release locking assembly.
Figure 2:
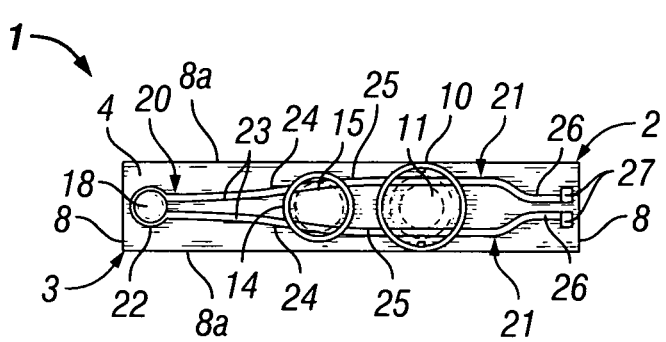
FIG. 2 is a top view of the quick release locking assembly illustrated in FIG. 1, with the eye hook and the release tool (illustrated in phantom) inserted in the lock conduit and the release conduit, respectively.
Figure 2A:
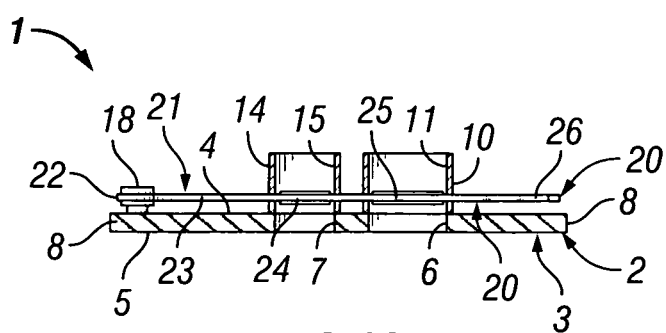
FIG. 2A is a longitudinal sectional view of the quick release locking assembly illustrated in FIG. 1.

Referring initially to FIGS. 1, 2 and 2A of the drawings, an illustrative embodiment of the quick release locking assemblies, hereinafter assembly, is generally indicated by reference numeral 1. The assembly 1 may include a locking assembly insert 2 which may have a spring support 3. In some embodiments, the spring support 3 may have a generally elongated, rectangular shape with an outer surface 4; an inner surface 5; opposite end surfaces 8 and opposite side surfaces 8a, as illustrated in FIGS. 1 and 2. In other embodiments, the spring support 3 may have alternative shapes. The spring support 3 of the locking assembly insert 2 may be plastic, metal, wood or composite material, for example and without limitation.

As illustrated in FIG. 2A, at least one lock opening 6 and at least one release opening 7 may extend through the spring support 3 from the outer surface 4 to the inner surface 5 thereof. In some embodiments, the lock opening 6 and the release opening 7 may extend through the spring support 3 in generally adjacent, spaced-apart relationship with respect to each other. At least one lock conduit 10, which may be cylindrical, may extend from the outer surface 4 of the spring support 3. The lock conduit 10 has a lock conduit interior 11 which communicates with the lock opening 6. At least one release conduit 14, which may be cylindrical, may also extend from the outer surface 4 of the spring support 3. The release conduit 14 has a release conduit interior 15 which communicates with the release opening 7. As illustrated in FIG. 2, in some embodiments, the lock conduit 10 may have a width or diameter which is larger than the width or diameter of the release conduit 14. As illustrated in FIG. 1, a pair of spaced-apart spring slots 12 may be provided in opposite sides of the lock conduit 10 and pair of spaced-apart spring slots 16 may be provided in opposite sides of the release conduit 14. The purpose of the spring slots 12, 16 will be hereinafter described.

A flexible lock spring 20 of the locking assembly insert 2 may be provided on the spring support 3. In some embodiments, the lock spring 20 may include a spring loop 22. At least one spring arm 21 may extend from the spring loop 22. In some embodiments, the spring loop 22 connects a pair of elongated, spaced-apart, parallel spring arms 21. The spring arms 21 may include a pair of proximal arm segments 23 which diverge from the spring loop 22. A pair of diverging release arm segments 24 may extend from the proximal arm segments 23, respectively. A pair of parallel lock arm segments 25 may extend from the release arm segments 24, respectively. A pair of terminal arm segments 26 having a pair of spring ends 27, respectively, may extend from the lock arm segments 25, respectively.

A spring mount peg 18 may extend from the outer surface 4 of the spring support 3 generally adjacent to one of the end surfaces 8 of the spring support 3. The spring loop 22 of the lock spring 20 may extend around the spring mount peg 18 and may be attached to the spring mount peg 18 using a friction-fit, glue, adhesive and/or other suitable attachment technique known by those skilled in the art. Accordingly, the longitudinal axis of the spring arms 21 of the lock spring 20 may be disposed in generally parallel relationship with respect to the plane of the outer surface 4 of the spring support 3. As illustrated in FIGS. 1 and 2, the release arm segments 24 of the spring arms 21 may extend through the respective spring slots 16 of the release conduit 14 and extend transversely through opposite portions of the release conduit interior 15, as illustrated in FIG. 2. In like manner, the lock arm segments 25 of the spring arms 21 may extend through the respective spring slots 12 of the lock conduit 10 and extend transversely through opposite portions of the lock conduit interior 11.

In application of the assembly 1, which will be hereinafter further described, an eye hook 34 or other connector or locking element may be inserted into the lock conduit interior 11 and locked in place in the lock conduit 10 by engagement of the lock arm segments 25 of the spring arms 21 with the eye hook 34. In some embodiments, the eye hook 34 may include a generally elongated eye hook shaft 35 having a shaft end 36 which may be generally convex or tapered, as illustrated in FIG. 1. A circumferential spring notch 37 may be provided in the eye hook shaft 35 generally adjacent to the shaft end 36. An eye 38 may be provided on the eye hook shaft 35 opposite the shaft end 36. Accordingly, as the eye hook shaft 35 is inserted into the lock conduit 10, the shaft end 36 pushes against and separates the lock arm segments 25 of the respective spring arms 21 until the lock arm segments 25 snap into the opposite sides of the spring notch 37. Therefore, the lock arm segments 25 lock the eye hook shaft 35 of the eye hook 34 in the lock conduit interior 11 of the lock conduit 10. When the eye hook 34 is locked in place in the lock conduit 10, the shaft end 36 of the eye hook shaft 35 may protrude through the lock opening 6 (FIG. 2A) in the spring support 3.

A release tool 30 can be inserted into the release conduit interior 15 of the release conduit 14 to selectively disengage the lock arm segments 25 of the spring arms 21 from the spring notch 37 and facilitate release and removal of the eye hook 34 from the lock conduit 10. In some embodiments, the release tool 30 may generally include a generally elongated release tool shaft 31 having a release tool end 32 which may be generally convex or tapered, as illustrated in FIG. 1. Accordingly, as the release tool 30 is inserted into the release conduit 14, the release tool end 32 pushes against and then separates the release arm segments 24 of the respective spring arms 21. This action spreads the lock arm segments 25 of the lock spring 20 in the lock conduit interior 11 of the lock conduit 10 until the lock arm segments 25 disengage the spring notch 37 in the eye hook shaft 35 of the eye hook 34. Therefore, the eye hook 34 can be removed from the lock conduit interior 11 of the lock conduit 10. When the release tool 30 is locked in place in the release conduit 14, the release tool end 32 of the release tool 30 may protrude through the release opening 7 (FIG. 2A) in the spring support 3. As illustrated in FIG. 2, in some embodiments the width or diameter of the lock conduit 10 may be greater than the width or diameter of the release conduit 14. This may prevent misplacement of the eye hook 34 in the release conduit 14 instead of the lock conduit 10. Generally, the release tool 30 may be any object having a shaft 31 and a convex or tapered end 32. For example and without limitation, in some applications a writing pen, pencil or straight pin (not illustrated) or the like may be used as the release tool 30 in spreading the spring arms 21 and disengaging the lock arm segments 25 from the spring notch 37 of the eye hook 34 by insertion of the pointed or tapered end of the pen or pencil in the release conduit 14, as was heretofore described.

Figure 2B:
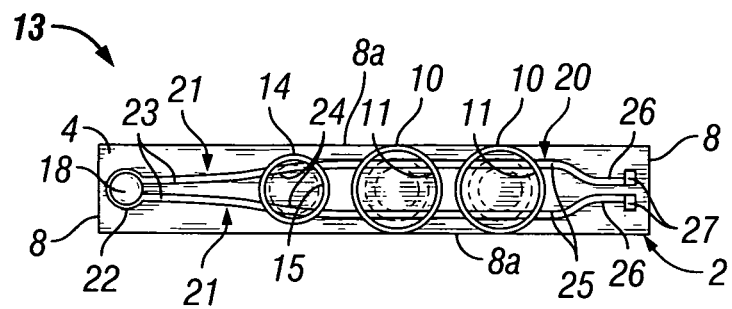
FIG. 2B is a top view of an alternative illustrative embodiment of the quick release locking assemblies.
Figure 2C:
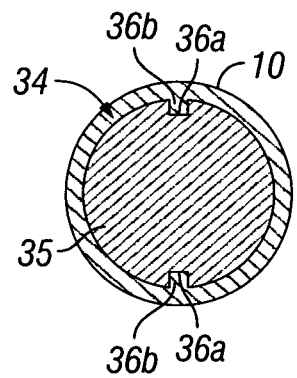
FIG. 2C is a cross-sectional view of a lock conduit of an illustrative embodiment of the quick release locking assemblies and an eye hook inserted in the lock conduit, more particularly illustrating a pair of guide slots provided in the eye hook and a pair of guide flanges provided in the lock conduit and receiving the guide slots.

Referring next to FIG. 2C of the drawings, in some embodiments of the assembly, at least one guide flange 36b may extend from the interior surface of the lock conduit 10. At least one guide slot 36a may be provided in the exterior surface of the eye hook shaft 35 of the eye hook 34. The guide slot 36a may receive the guide flange 36b as the eye hook shaft 35 is inserted in the lock conduit 10 to prevent the eye hook 34 from rotating when locked in the lock conduit 10. In other embodiments, the guide flange 36b may be provided on the exterior surface of the eye hook shaft 35 and the guide slot 36a may be provided on the interior surface of the lock conduit 10.

Referring next to FIG. 3 of the drawings, exemplary application of an illustrative embodiment of the assembly 1 is illustrated. Accordingly, at least one quick release locking assembly 1 may be provided on a lure body surface 44 of a fishing lure 40 to facilitate connection of at least one attachment such as a fishing line 48 and/or treble hooks 43, for example and without limitation, to the fishing lure 40. In some applications, the fishing lure 40 may be shaped in the configuration of a minnow or fish and have a hard or soft body fishing lure body 41 with a fishing lure tail 42. In other applications, the fishing lure 40 may be shaped in the configuration of a worm, frog, crawfish or other water creature. The fishing lure body 41 may have an upper body portion 41a and a lower body portion 41b. At least one quick release locking assembly 1 may be provided in each of the upper body portion 41a and the lower body portion 41b of the fishing lure body 41. In some applications, a first quick release locking assembly 1a may be provided in the upper body portion 41a to facilitate attachment of a fishing line 48 to the fishing lure 40. A second quick release locking assembly 1b and a third quick release locking assembly 1c may be provided in the lower body portion 41b, as illustrated, to facilitate attachment of a pair of treble hooks 43 to the fishing lure 40.

Each quick release locking assembly 1a-1c may be integrated into the fishing lure body 41 by molding the locking assembly insert 2 into the hard or soft plastic fishing lure body 41 beneath the lure body surface 44, as illustrated with respect to the first quick release locking assembly 1a, according to molding fabrication techniques which are well-known to those skilled in the art. A spring cavity (not illustrated) may be included in the fishing lure body 41 to facilitate accommodation and movement of the lock spring 20 in locking and unlocking of the eye hook 34, as was heretofore described with respect to FIG. 1. The lock conduit 10 and the release conduit 14 of each quick release locking assembly 1a-1c may be disposed just beneath the lure body surface 44 of the fishing lure body 41, as further illustrated with respect to the first quick release locking assembly 1a. As illustrated in FIG. 3A, a surface lock opening 45 and a surface release opening 46 may be provided in the lure body surface 44 in communication with the lock conduit interior 11 (FIG. 2) of the lock conduit 10 and the release conduit interior 15 (FIG. 2) of the release conduit 14. The surface lock opening 45 may be larger in diameter than the surface release opening 46, as illustrated.

The quick release locking assemblies 1a-1c are operable to facilitate selective and expeditious detachable connection of various attachments such as spinners (not illustrated), treble hooks 43 and/or a fishing line 48, for example and without limitation, to the fishing lure 40. Accordingly, a first eye hook 34a may be attached to the first quick release locking assembly 1a by inserting the shaft end 36 (FIG. 1) on the eye hook shaft 35 of the first eye hook 34a into the lock conduit interior 11 (FIG. 2) of the lock conduit 10 until the lock arm segments 25 of the lock spring 20 snap into the respective sides of the spring notch 37, as was heretofore described with respect to FIG. 1. The fishing line 48, which in some applications may be wound on a crank (not illustrated) provided on a fishing rod 47, may be tied to the eye 38 of the first eye hook 34a. Therefore, the first eye hook 34a is operable to secure the fishing line 48 to the fishing lure 40 during casting and subsequent retrieval of the fishing lure 40 through a lake (not illustrated) or other water body by operation of the fishing rod 47, typically in the conventional manner. In like manner, a second eye hook 34b and a third eye hook 34c, with a treble hook 43 attached to each, may be connected to the second quick release locking assembly 1b and the third quick release locking assembly 1c, respectively.

It will be appreciated by those skilled in the art that the first eye hook 34a may be readily detached from the first quick release locking assembly 1a by inserting the release tool end 32 (FIG. 1) of the release tool 30 into the release conduit interior 15 of the release conduit 14. This action spreads the release arm segments 24 and causes disengagement of the lock arm segments 25 of the lock spring 20 from the spring notch 37 of the first eye hook 34a, as was heretofore described with respect to FIG. 1, thus enabling the eye hook 34 to be pulled from the lock conduit 10. A different fishing lure can then be attached to the fishing line 48 of the fishing rod 47 by inserting the eye hook 34 which remains attached to the fishing line 48 of the fishing rod 47 into the lock conduit 10 of a quick release locking assembly 1 provided on the other fishing lure. In like manner, the treble hooks 43 can be selectively detached from the second quick release locking assembly 1b and the third quick release locking assembly 1c, respectively, by inserting a release tool 30 into the release conduit 14 of each. The detached treble hooks 43 can be interchanged with other hooks of a different type or size by inserting eye hooks 34 to which the other hooks are attached into the lock conduits 10 of the respective second quick release locking assembly 1b and third quick release locking assembly 1c.

Referring next to FIG. 2B of the drawings, an alternative illustrative embodiment of the quick release locking assemblies is generally indicated by reference numeral 13. In the assembly 13, at least two lock conduits 10 each having a pair of spring slots 12 (FIG. 1) may extend from the outer surface 4 of the spring support 3. At least one release conduit 14 each having a pair of spring slots 16 (FIG. 1) may extend from the outer surface 4 of the spring support 3. The release arm segments 24 of the respective spring arms 21 of the lock spring 20 may extend through the spring slots 16 of each release conduit 14. In like manner, the lock arm segments 25 of the respective spring arms 21 may extend through the spring slots 12 of each lock conduit 10. Accordingly, multiple eye hooks 34 may be connected to the quick release locking assembly 13 by inserting the eye hooks 34 into the respective lock conduits 10 as was heretofore described with respect to the quick release locking assembly 1 in FIG. 1. The eye hooks 34 may be selectively detached from the lock conduits 10 of the quick release locking assembly 13 by inserting a release tool 30 into the release conduit 14, as was heretofore described.

Figure 4:
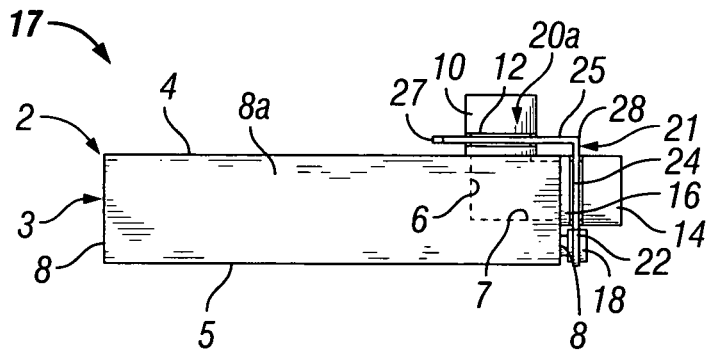
FIG. 4 is a side view of an alternative illustrative embodiment of the quick release locking assemblies.
Figure 5:
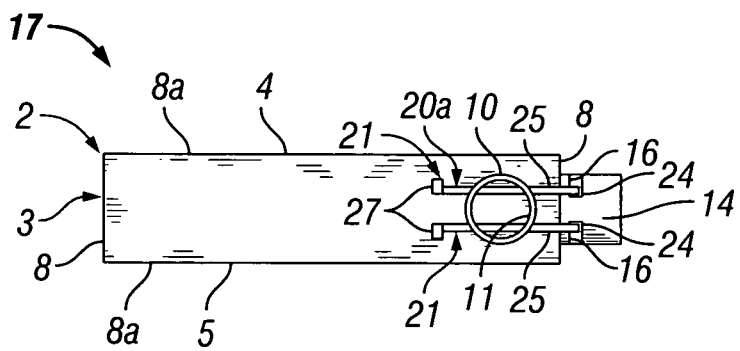
FIG. 5 is a top view of the quick release locking assembly illustrated in FIG. 4.

Referring next to FIGS. 4 and 5 of the drawings, another alternative illustrative embodiment of the quick release locking assemblies is generally indicated by reference numeral 17. The assembly 17 may be used in applications in which it is necessary or desirable to access the release conduit 14 at a generally 90-degree angle with respect to the lock conduit 10. Accordingly, at least one lock conduit 10 may extend from the outer surface 4 of the spring support 3. At least one release conduit 14 may extend from an end surface 8 of the spring support 3. As illustrated in FIG. 4, the release conduit 14 may be oriented in generally perpendicular relationship with respect to the lock conduit 10. A spring mount peg 18 may be provided on the end surface 8 of the spring support 3 generally adjacent to the release conduit 14. The lock spring 20a may include a spring loop 22 which extends around the spring mount peg 18 and a pair of spring arms 21 having a pair of spaced-apart release arm segments 24 which extend from the spring loop 22 and a pair of spaced-apart lock arm segments 25 which extend from the release arm segments 24, respectively. A generally perpendicular spring bend 28 (FIG. 4) is provided in each of the spring arms 21 between the release arm segments 24 and the lock arm segments 25. Therefore, the release arm segments 24 of the spring arms 21 extend through the spring slots 16 of the release conduit 14 and the lock arm segments 25 of the spring arms 21 extend through the spring slots 12 of the lock conduit 10. The lock opening 6 and the release opening 7 may communicate with the lock conduit interior 11 (FIG. 2) and the release conduit interior 15 (FIG. 2), respectively, and extend into or through the spring support 3 as illustrated in phantom in FIG. 4.

Figure 6:
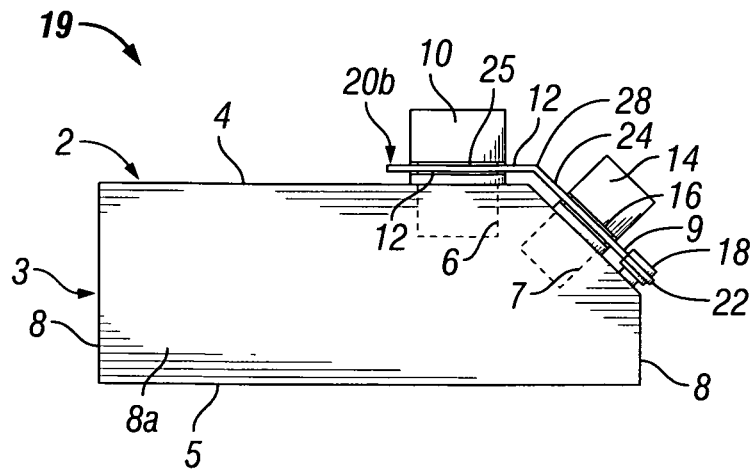
FIG. 6 is a side view of another alternative illustrative embodiment of the quick release locking assemblies.
Figure 7:
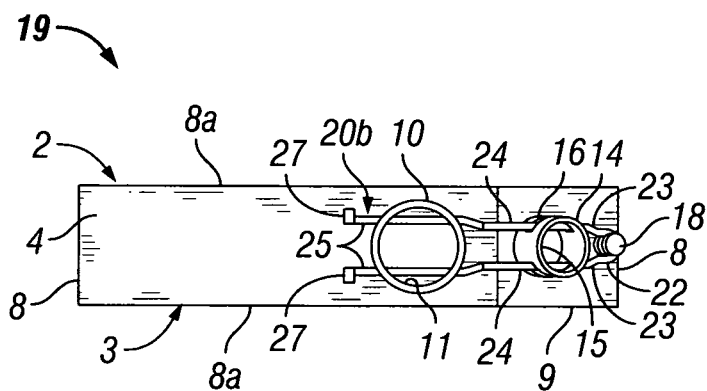
FIG. 7 is a top view of the quick release locking assembly illustrated in FIG. 6.

Referring next to FIGS. 6 and 7 of the drawings, still another illustrative embodiment of the quick release locking assemblies is generally indicated by reference numeral 19. The assembly 19 may be used in applications in which it is necessary or desirable to access the release conduit 14 at an angle of between about 0 degrees and about 90 degrees with respect to the lock conduit 10. In the embodiment of the assembly 19 which is illustrated in FIGS. 6 and 7, the release conduit 14 is accessed at a generally 45-degree angle with respect to the lock conduit 10. Accordingly, a sloped surface 9 may extend between the outer surface 4 and the end surface 8 of the spring support 3. The sloped surface 9 may be disposed at a generally 45-degree angle (or other angle between 0 and 90 degrees) with respect to the outer surface 4 of the spring support 3. At least one lock conduit 10 may extend from the outer surface 4 of the spring support 3. At least one release conduit 14 may extend from the sloped surface 9 of the spring support 3. As illustrated in FIG. 6, the release conduit 14 may be oriented at a generally 45-degree angle with respect to the lock conduit 10. A spring mount peg 18 may be provided on the sloped surface 9 of the spring support 3 generally adjacent to the release conduit 14. The lock spring 20b may include a spring loop 22 which extends around the spring mount peg 18 and a pair of spring arms 21 having a pair of spaced-apart release arm segments 24 which extend from the spring loop 22 and a pair of spaced-apart lock arm segments 25 which extend from the release arm segments 24, respectively. A generally 45-degree angle spring bend 28 (FIG. 6) is provided in each of the spring arms 21 between the release arm segment 24 and the lock arm segment 25. The release arm segments 24 of the spring arms 21 extend through the spring slots 16 of the release conduit 14 and the lock arm segments 25 of the spring arms 21 extend through the spring slots 12 of the lock conduit 10. As illustrated in FIG. 6, the lock opening 6 and the release opening 7 may communicate with the lock conduit interior 11 (FIG. 2) of the lock conduit 10 and the release conduit interior 12 (FIG. 2) of the release conduit 14, respectively, and extend into the spring support 3 as illustrated in phantom in FIG. 6.

Figure 8:
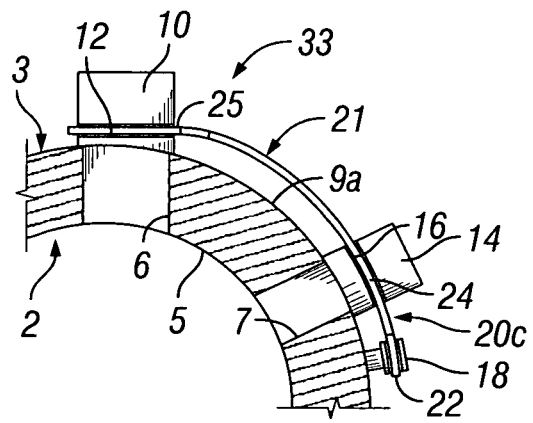
FIG. 8 is a sectional view of still another alternative illustrative embodiment of the quick release locking assemblies.
Figure 9:
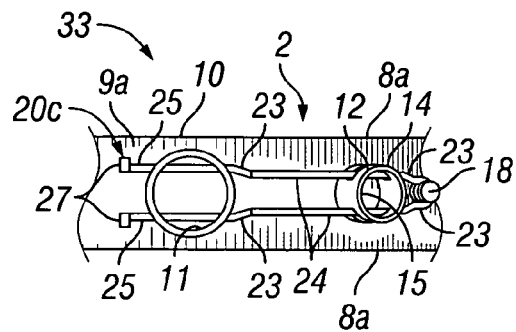
FIG. 9 is a top view, partially in section, of the quick release locking assembly illustrated in FIG. 8.

Referring next to FIGS. 8 and 9 of the drawings, another alternative illustrative embodiment of the quick release locking assemblies is generally indicated by reference numeral 33. The assembly 33 may be used in applications in which it is necessary or desirable for the lock conduit 10 and the release conduit 14 to be provided together on a convex or curved surface 9a. Accordingly, the spring support 3 of the locking assembly insert 2 may include the convex or curved surface 9a. At least one lock conduit 10 and at least one release conduit 14 may extend from the curved surface 9a of the spring support 3. A spring mount peg 18 may be provided on the curved surface 9a of the spring support 3 generally adjacent to the release conduit 14. The lock spring 20c may include a spring loop 22 which extends around the spring mount peg 18 and a pair of spring arms 21 having a pair of spaced-apart release arm segments 24 which extend from the spring loop 22 and a pair of spaced-apart lock arm segments 25 which extend from the release arm segments 24, respectively. As illustrated in FIG. 8, each of the spring arms 21 may have a curvature which generally corresponds to the curvature of the curved surface 9a of the spring support 3. The release arm segments 24 of the spring arms 21 extend through the spring slots 16 of the release conduit 14 and the lock arm segments 25 of the spring arms 21 extend through the spring slots 12 of the lock conduit 10. The lock opening 6 and the release opening 7 may communicate with the lock conduit interior 11 (FIG. 2) of the lock conduit 10 and the release conduit interior 15 (FIG. 2) of the release conduit 14, respectively, and extend into the spring support 3 as illustrated in phantom in FIG. 8.

Figure 10:
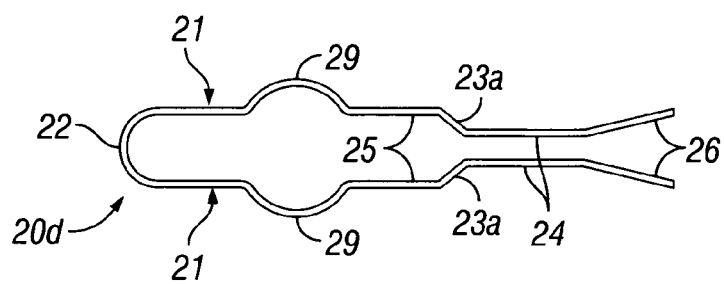
FIG. 10 is a top view of a lock spring which is suitable for implementation of an illustrative embodiment of the quick release locking assemblies.
Figure 10A:
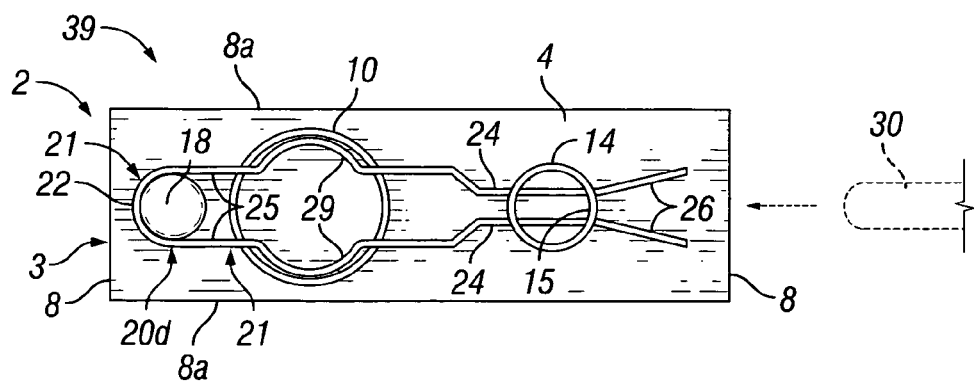
FIG. 10A is a top view of another alternative illustrative embodiment of the quick release locking assemblies which utilizes the lock spring illustrated in FIG. 10.

Referring next to FIGS. 10 and 10A of the drawings, another alternative illustrative embodiment of the quick release locking assemblies is generally indicated by reference numeral 39 in FIG. 10A. The assembly 39 includes a lock spring 20d having a spring loop 22 which extends around a spring mount peg 18. A pair of spaced-apart spring arms 21 extends from the spring loop 22. The spring arms 21 may include a pair of spaced-apart lock arm segments 25; a pair of partial radii 29 formed in the lock arm segments 25, respectively; a pair of release arm segments 24 extending from the lock arm segments 25, respectively; and a pair of terminal arm segments 26 terminating the release arm segments 24, respectively. The release arm segments 24 of the respective spring arms 21 extend through the spring slots 16 of the release conduit 14 and the lock arm segments 25 of the spring arms 21 extend through the spring slots 12 of the lock conduit 10. As illustrated in FIG. 10A, the partial radii 29 in the respective spring arms 21 of the lock spring 20 are disposed inside the lock conduit interior 11 of the lock conduit 10. Accordingly, the partial radii 29 may increase the surface locking area of the spring arms 21 in the lock conduit interior 11 for enhanced locking capability of the eye hook 34 in the lock conduit 10 in application of the quick release locking assembly 39. The eye hook 34 may be released from the lock conduit 10 by inserting a release tool 30 (illustrated in phantom) between the diverging terminal arm segments 26 of the lock spring 20, thereby spreading the spring arms 21 and disengaging the partial radii 29 from the spring notch 37 of the eye hook 34 and permitting release of the eye hook 34 from the lock conduit 10.

Figure 11:
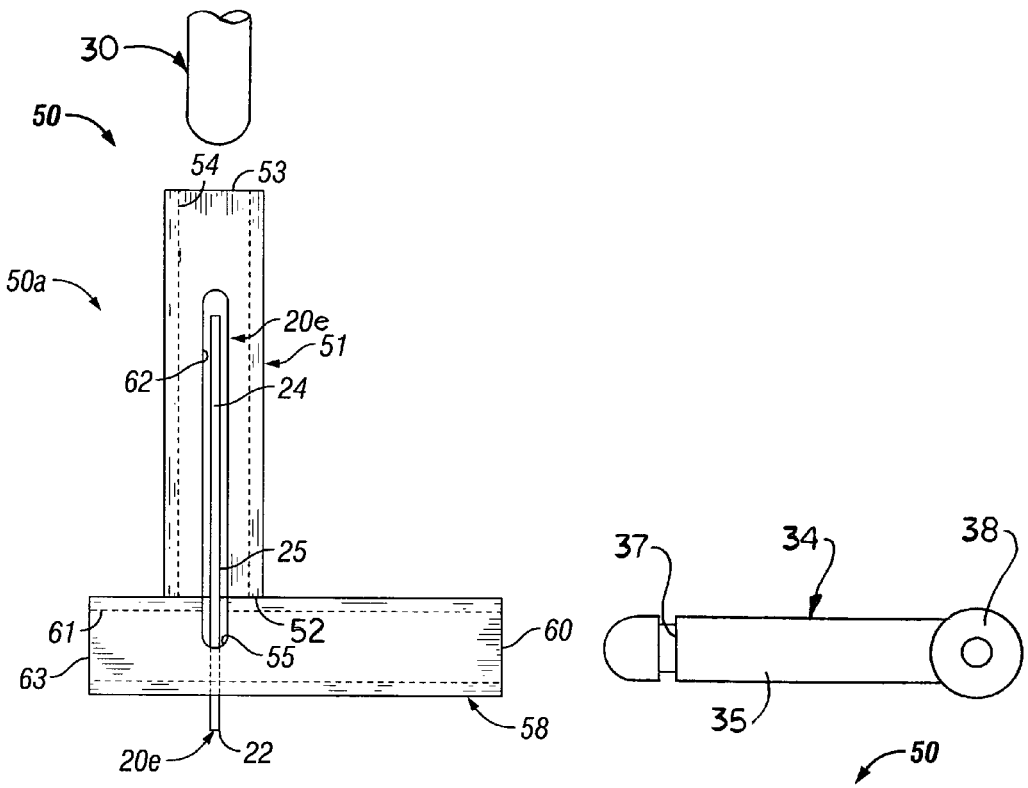
FIG. 11 is a side view of another alternative illustrative embodiment of the quick release locking assemblies.
Figure 12:
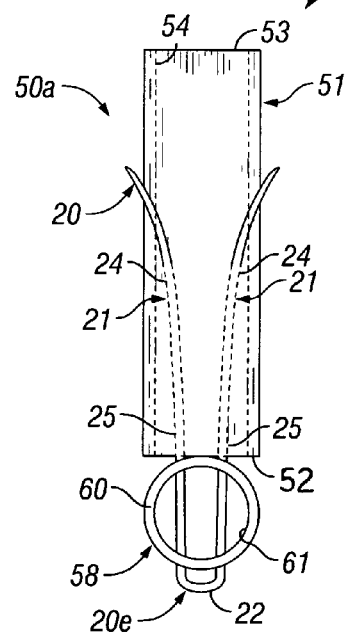
FIG. 12 is a front view of the quick release locking assembly illustrated in FIG. 11.

Referring next to FIGS. 11 and 12 of the drawings, another alternative illustrative embodiment of the quick release locking assemblies is generally indicated by reference numeral 50. The quick release locking assembly 50 may have a locking assembly insert 50a which in some embodiments may be incorporated into the fishing lure body 41 (FIG. 3) of a fishing lure 40 to facilitate connection of various attachments such as a fishing line 48 and/or hooks 43 to the fishing lure 40 as was heretofore described with respect to the quick release locking assembly 1. The locking assembly insert 50a may include a release conduit 51 having an inner release conduit end 52, a release tool insertion end 53, and a release conduit interior 54. Spaced-apart spring slots 62 (one of which is illustrated in FIG. 11) may be provided in the release conduit 51. A lock conduit 58 may have an inner lock conduit end 63 an eye hook insertion end 60 which is opposite the inner lock conduit end 63, and a lock conduit interior 61. The inner release conduit end 52 of the release conduit 51 may abut against the lock conduit 58 between the eye hook insertion end 60 and the inner lock conduit end 63 of the lock conduit 58. Elongated, spaced-apart spring slots 55 may be provided in the lock conduit 58. The spring slots 55 in the lock conduit 58 may communicate with the respective spring slots 62 in the release conduit 51, as illustrated in FIG. 11.

A lock spring 20e may be inserted in the spring slots 55 of the lock conduit 58 and the spring slots 62 of the release conduit 51. As illustrated in FIG. 12, the lock spring 20e may include a spring loop 22; a pair of spring arms 21 having a pair of spaced-apart lock arm segments 25 extending from the spring loop 22; and a pair of spaced-apart, diverging release arm segments 24 extending from the respective lock arm segments 25. The lock arm segments 25 may extend transversely through the lock conduit interior 61 of the lock conduit 58, as illustrated in FIG. 12. The release arm segments 24 of the spring arms 21 may extend longitudinally through the release conduit interior 54 of the release conduit 51 and protrude through the respective spring slots 62 in the release conduit 51.

As illustrated in FIG. 11, the lock conduit interior 61 of the lock conduit 58 may be adapted to receive an eye hook 34 having an eye hook shaft 35 with an eye 38. A spring notch 37 may be provided in the eye hook shaft 35. Upon insertion of the eye hook shaft 35 into the lock conduit interior 61, the eye hook shaft 35 extends between the spaced-apart spring arms 21 of the lock spring 20 until the lock arm segments 25 of the lock spring 20e lock into the respective sides of the spring notch 37 in the eye hook shaft 35. Accordingly, the eye hook 34 is locked in place in the lock conduit interior 61. The eye hook 34 can be selectively released from the lock conduit interior 61 of the lock conduit 58 by inserting a release tool 30 through the release tool insertion end 53 into the release conduit interior 54 of the release conduit 51 and between the diverging release arm segments 24 of the spring arms 21. This action spreads the spring arms 21 apart such that the release arm segments 24 extend outwardly through the respective spring slots 62 in the release conduit 51 and disengage the lock arm segments 25 of the lock spring 20 from the spring notch 37 in the eye hook shaft 35 of the eye hook 34. The eye hook 34 can then be pulled from the lock conduit interior 61 of the lock conduit 58 in an unimpeded manner.

Figure 13:
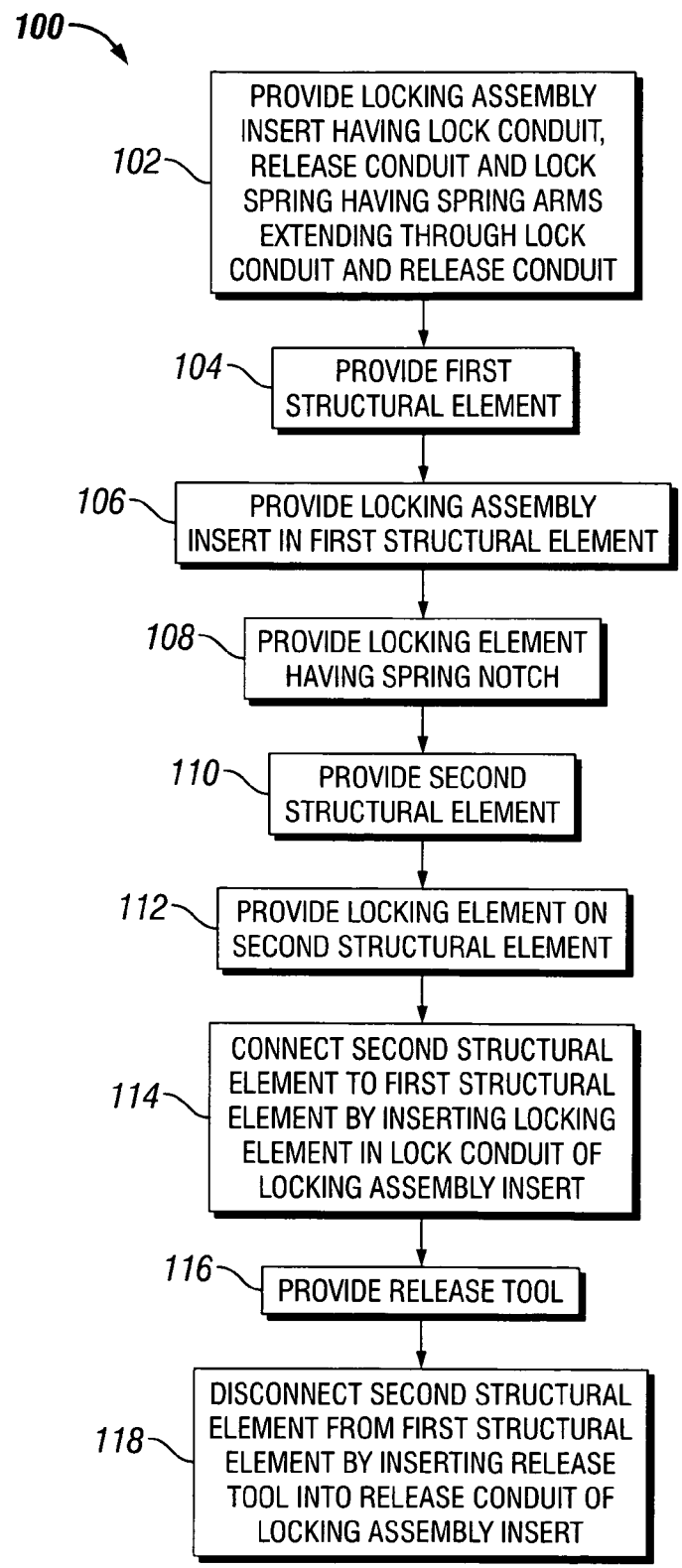
FIG. 13 is a flow diagram of an illustrative embodiment of a method of attaching a second structural element to a first structural element.

Referring next to FIG. 13 of the drawings, a flow diagram 100 of an illustrative embodiment of a method of detachably connecting a second structural element to a first structural element is illustrated. In block 102, a locking assembly insert having a lock conduit, a release conduit and a lock spring having spring arms extending through the lock conduit and the release conduit is provided. In block 104, a first structural element is provided. In block 106, the locking assembly insert is provided in the first structural element. In block 108, a locking element having a spring notch is provided. In block 110, a second structural element is provided. In block 112, the locking element is provided on the second structural element. In block 114, the second structural element is connected to the first structural element by inserting the locking element in the lock conduit of the locking assembly insert. In block 116, a release tool is provided. In block 118, the second structural element is disconnected from the first structural element by inserting the release tool into the release conduit of the locking assembly insert.

Figure 14:
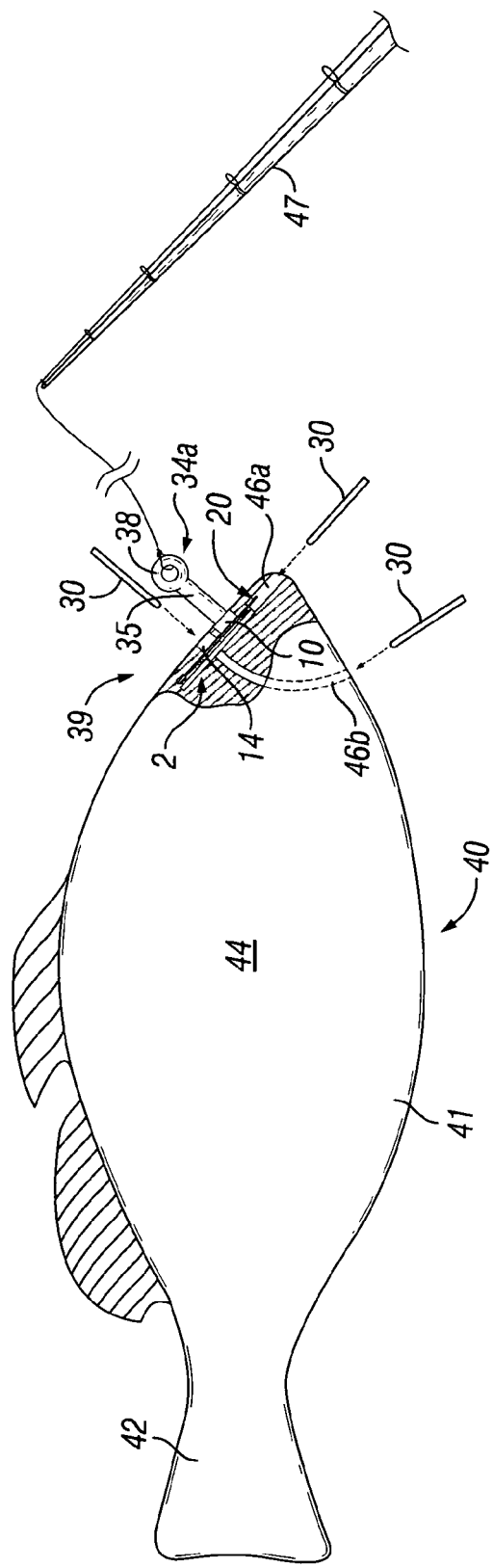
FIG. 14 is a side view, partially in section, of a fishing lure, with a quick release locking assembly provided on the surface of the fishing lure and a fishing line attached to the quick release locking assembly, more particularly illustrating multiple possible surface release openings provided in the fishing lure to facilitate selective release of the fishing line from the fishing lure from various directions.

Referring next to FIG. 14 of the drawings, the illustrative embodiment of the quick release locking assembly 39 which is illustrated in FIG. 10A is integrated into a fishing lure 40. The release conduit 14 may be accessed with the release tool 30 through the surface release opening 46 in the lure body surface 44 of the fishing lure 40, as was heretofore described with respect to the quick release locking assembly 1 in FIGS. 3 and 3A. Alternatively, it will be appreciated by those skilled in the art that the lock spring 20 can be selectively manipulated to release the eye hook 34 from the lock conduit 10 by inserting a release tool 30 through a first surface release channel 46a which opens to the front of the lure body surface 44 and between the terminal arm segments 26 (FIG. 10A) of the lock spring 20d. Further in the alternative, the lock spring 20 can be selectively manipulated to release the eye hook 34 from the lock conduit 10 by inserting a release tool 30 through a second surface release channel 46b which opens to the bottom of the lure body surface 44 and into the release conduit 14 through a release opening (not illustrated) which extends through the locking assembly insert 2 and communicates with the release conduit 14. Therefore, the eye hook 34 can be selectively released from the lock conduit 10 from any of multiple directions in the event that one or more of the access points for the release tool 30 is blocked by hooks, spinners or other structural elements attached to the fishing lure 40. In some applications, the fishing lure 40 may be fabricated with each of the surface release opening 46, the first surface release channel 46a and the second surface release channel 46b in the lure body 41. In other applications, the fishing lure 40 may be fabricated with a selected one of the surface release opening 46, the first surface release channel 46a and the second surface release channel 46b in the lure body 41. It will be recognized and understood that various additional or alternative surface release channels 46 may be provided in various locations in the lure body 41 depending on the preferences of the manufacturer.

Figure 15:
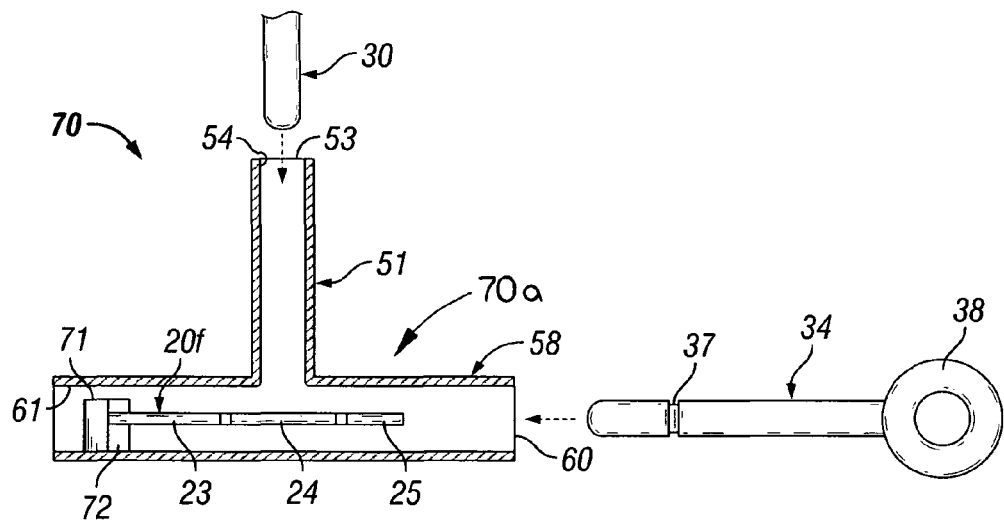
FIG. 15 is a side sectional view of an alternative illustrative embodiment of a quick release locking assembly, more particularly illustrating insertion of an eye hook into a lock conduit of the assembly and insertion of a release tool into a release conduit of the assembly.
Figure 16:
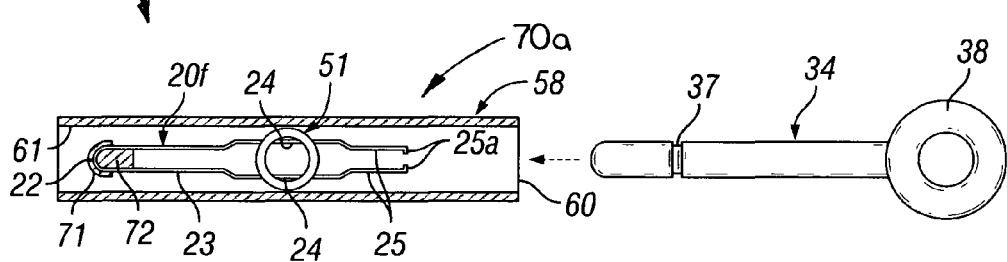
FIG. 16 is a top sectional view of the illustrative embodiment of the quick release locking assembly illustrated in FIG. 15, more particularly illustrating insertion of an eye hook into the lock conduit.
Figure 17:
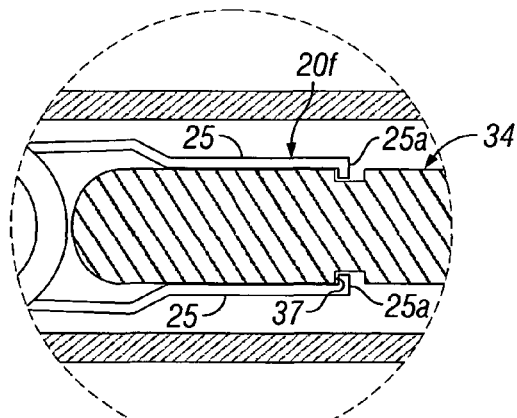
FIG. 17 is an enlarged sectional view which illustrates engagement of a lock spring with a spring notch in the eye hook after insertion of the eye hook into the lock conduit of the quick release locking assembly illustrated in FIG. 15.

Referring next to FIGS. 15-17 of the drawings, another alternative illustrative embodiment of the quick release locking assembly is generally indicated by reference numeral 70. The assembly 70 includes a locking assembly insert 70*a* which in some embodiments may be integrated into the fishing lure body 41 (FIG. 3) of a fishing lure 40 to facilitate connection of various attachments such as a fishing line 48 and/or hooks 43 to the fishing lure 40 as was heretofore described with respect to the quick release locking assembly 1. The locking assembly insert 70*a* of the locking assembly 70 may include a generally elongated, tubular release conduit 51 having a release conduit interior 54 with a release tool insertion end 53. A generally elongated, tubular lock conduit 58 may be oriented in generally perpendicular relationship with respect to the release conduit 51. The lock conduit 58 may have a lock conduit interior 61 which is disposed in fluid communication with the release conduit interior 54 of the release conduit 51. A lock spring 20*f* having a spring loop 22 and a pair of spaced-apart spring arms 21 extending from the spring loop 22 may be provided in the lock conduit interior 61 of the lock conduit 58. As illustrated in FIG. 16, the spring arms 21 of the lock spring 20*f* may include a pair of parallel proximal arm segments 23; a pair of release arm segments 24 which extend from the proximal arm segments 23, respectively; a pair of lock arm segments 25 which extend from the release arm segments 24, respectively; and a pair of lock flanges 25*a* which extend inwardly from the respective lock arm segments 25. As illustrated in FIG. 16, in some embodiments the release arm segments 24 may be expanded outwardly relative to the proximal arm segments 23. The release arm segments 24 may be aligned or registered with the release conduit interior 54 of the release conduit 51.

The lock spring 20*f* may be mounted in the lock conduit interior 61 of the lock conduit 58 using any suitable technique which is known by those skilled in the art. In some embodiments, the lock spring 20*f* may be mounted in the lock conduit interior 61 by a spring mount peg 18 as was heretofore described with respect to the lock spring 20 in FIGS. 1 and 2. As illustrated in FIGS. 15 and 16, in other embodiments the spring loop 22 of the lock spring 20*f* may be secured between a curved outer spring retainer 71 and a curved inner spring retainer 72.

In exemplary application, the quick release locking assembly 70 may be integrated into the fishing lure body 41 of a fishing lure 40, as was heretofore described with respect to FIG. 3. An eye hook 34 can be locked in place inside the lock conduit interior 61 of the lock conduit 58 by inserting the eye hook 34 into the eye hook insertion end 60 until the eye hook 34 separates the lock arm segments 25 of the lock spring 20*f* and the lock flanges 25*a* snap into the respective sides of the spring notch 37, as illustrated in FIG. 17. The eye hook 34 can be selectively detached and removed from the lock conduit 58 by inserting a release tool 30 into the release tool insertion end 53 of the release conduit 51 and through the release conduit interior 54 until the release tool 30 wedges or forces the release arm segments 24 of the lock spring 20*f* apart and facilitates disengagement of the lock flanges 25*a* of the lock spring 20*f* from the spring notch 37 of the eye hook 34. Accordingly, the eye hook 34 can be removed from the lock conduit 58 in an unimpeded manner.

Figure 18:
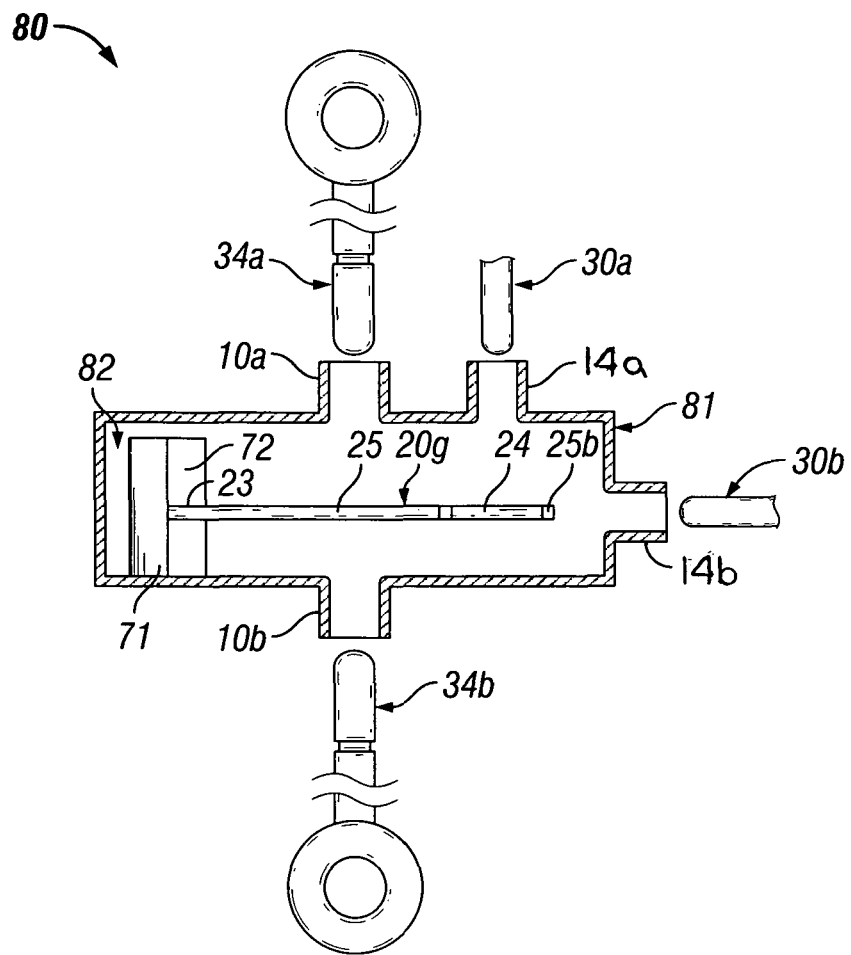
FIG. 18 is a side sectional view of an alternative illustrative embodiment of the quick release locking assembly, more particularly illustrating insertion of an eye hook into a selected one of a pair of lock conduits and insertion of a release tool into a selected one of a pair of release conduits.
Figure 19:
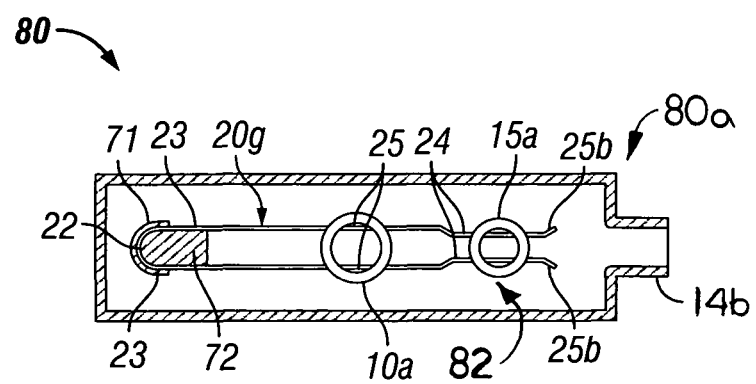
FIG. 19 is a top sectional view of the quick release locking assembly illustrated in FIG. 18.

Referring next to FIGS. 18 and 19 of the drawings, an alternative illustrative embodiment of the quick release locking assembly is generally indicated by reference numeral 80. In an exemplary application, the assembly 80 may be integrated into a fishing lure 40 to facilitate connection of various attachments such as a fishing line 48 and/or hooks 43 to the fishing lure 40 as was heretofore described with respect to the quick release locking assembly 1. The assembly 80 includes a locking assembly insert 80*a* which may include an assembly housing 81 having an assembly housing interior 82. A first lock conduit 10*a* and a second lock conduit 10*b* may extend from opposite sides of the assembly housing 81. A first release conduit 14*a* may extend from the assembly housing 81 generally adjacent to the first lock conduit 10*a*. A second release conduit 14*b* may extend from one end of the assembly housing 81. The second release conduit 14*b* may be oriented in generally perpendicular relationship with respect to the first lock conduit 10*a* and the second lock conduit 10*b*.

A lock spring 20*g* may be provided in the assembly housing interior 82 of the assembly housing 81. The lock spring 20*g* may include a spring loop 22 from which extends at least one spring arm 21. The spring arms 21 may include a pair of parallel proximal arm segments 23, a pair of lock arm segments 25 which extend from the respective proximal arm segments 23, a pair of parallel release arm segments 24 which extend from the respective lock arm segments 25 and a pair of diverging release flanges 25*b* which extend from the respective release arm segments 24. The lock arm segments 25 of the lock spring 20*g* may be disposed generally in alignment with the first lock conduit 10*a* and the second lock conduit 10*b*. The release arm segments 24 of the lock spring 20*g* may be disposed generally in alignment with the first release conduit 14*a*. The release flanges 25*b* may be disposed generally in alignment with the second release conduit 14*b*. Accordingly, an eye hook 34 can be locked in place in either the first lock conduit 10*a* or the second lock conduit 10*b* depending on which side of the locking assembly insert 80*a* locking of the eye hook 34 is to be made in the particular application of the assembly 80. A release tool 30 can be inserted into the first release conduit 14*a* or the second release conduit 14*b* to unlock and release the eye hook 34 from the first lock conduit 10*a* or the second lock conduit 10*b* depending on the ease of access of the first release conduit 14*a* or the second release conduit 14*b*. The first release conduit 14*a* and/or the second release conduit 14*b* may open to the lure body surface 44 (FIG. 3) of the fishing lure body 41 through a surface release opening 46 (FIG. 3A) and/or a release channel 46*a* or 46*b* (FIG. 14).

While the illustrative embodiments of the disclosure have been described above, it will be recognized and understood that various modifications can be made in the disclosure and the appended claims are intended to cover all such modifications which may fall within the spirit and scope of the disclosure.

What is claimed is:
1. A fishing lure, comprising:
 a fishing lure body adapted to generally simulate the appearance of a creature associated with a body of water; and
 at least one quick release locking assembly carried by said fishing lure body and having:
  at least one lock conduit having a lock conduit interior carried by said fishing lure body;
  at least one release conduit having a release conduit interior carried by said fishing lure body;
  a spring mount peg; and
  a flexible lock spring, the flexible lock spring comprising:

a spring loop which extends around and is attached to the spring mount peg, wherein the flexible lock spring is held to the spring mount peg by the spring loop;

a first spring arm and a second spring arm extending from the spring loop, wherein the first and second spring arms are spaced apart, and wherein each of the spring arms comprise:
  a lock arm segment extending through the at least one lock conduit;
  a release arm segment extending from the lock arm segments and extending through the at least one release conduit;
  a terminal arm segment terminating the release arm segment; and an eye hook including a spring notch, wherein the eye hook is inserted into the lock conduit, wherein the eye hook is held in the lock conduit by the lock arm segments of the first and second spring arms, engaged in the spring notch, wherein the eye hook is released from the lock conduit by inserting a release tool between the release arm segments thereby spreading the first and second spring arms.

2. The fishing lure of claim 1, further comprising a spring support embedded in said fishing lure body and wherein said lock conduit and said release conduit are carried by said spring support.

3. The fishing lure of claim 2, wherein the spring mount peg is formed from the spring support.

4. The fishing lure of claim 3, wherein said spring support comprises an outer surface, an inner surface opposite said outer surface, a pair of opposite end surfaces and a pair of opposite side surfaces.

5. The fishing lure of claim 4, wherein said lock conduit and said release conduit extend from said outer surface of said spring support.

6. The fishing lure of claim 5, further comprising a lock opening and a release opening wherein said lock conduit and said release conduit communicate with said lock opening and said release opening, respectively.

7. The fishing lure of claim 6, further comprising at least one spring slot provided in said lock conduit and at least one spring slot provided in said release conduit, and wherein at least one of the first spring arm or the second spring arm of said lock spring extends through said at least one spring slot provided in said lock conduit and said at least one spring slot provided in said release conduit.

8. The fishing lure of claim 7, wherein at least one of the first spring arm or the second spring arm includes a partial radii.

9. The fishing lure of claim 8, wherein partial radii is disposed inside the lock conduit interior to increase a surface locking area of the first spring arm or the second spring arm.

10. The fishing lure of claim 9, wherein the terminal arm segment of the first and second spring arms accepts the release tool to spread the first and second spring arms and release the eye hook.

11. The fishing lure of claim 10, wherein the release tool disengages the partial radii.

12. The fishing lure of claim 11, wherein the release tool accesses the terminal arm segments from a surface release channel formed in the fishing lure body.

13. The fishing lure of claim 12, wherein the release tool is inserted into the surface release channel.

14. The fishing lure of claim 9, wherein the release conduit accepts the release tool to spread the first and second spring arms and release the eye hook.

15. The fishing lure of claim 14, wherein the release tool disengages the partial radii.

16. The fishing lure of claim 15, wherein the release conduit includes a surface release opening formed in the fishing lure body.

17. The fishing lure of claim 16, wherein the release tool is inserted into the surface release opening.

18. The fishing lure of claim 4, wherein said lock conduit and said release conduit include an opening in said outer surface of said spring support.

19. A fishing lure, comprising:
  a fishing lure body having at least one fishing hook and adapted to generally simulate the appearance of a creature associated with a body of water; and
  at least one quick release locking assembly carried by said fishing lure body and having:
    at least one lock conduit having a lock conduit interior carried by said fishing lure body;
    at least one release conduit having a release conduit interior carried by said fishing lure body;
    a spring mount; and
    a flexible lock spring, the flexible lock spring comprising:
      a spring connector which is attached to the spring mount, wherein the flexible lock spring is held to the spring mount by the spring connector;
      a spring arm extending from the spring connector, wherein the spring arm comprises:
        a lock arm segment extending through the at least one lock conduit;
        a release arm segment extending from the lock arm segments and extending through the at least one release conduit;
        a terminal arm segment terminating the release arm segment; and
      a locking element for fishing including a spring notch, wherein the locking element is inserted into the lock conduit, wherein the locking element is held in the lock conduit by the lock arm segment, of the spring arm, engaged in the spring notch, wherein the locking element is released from the lock conduit by inserting a release tool to engage the release arm segment thereby deflecting the spring arm.

20. The fishing lure of claim 19, wherein spring connector is formed from a spring support.

21. The fishing lure of claim 19, wherein said spring support comprises an outer surface, an inner surface opposite said outer surface, a pair of opposite end surfaces and a pair of opposite side surfaces, and wherein said lock conduit and said release conduit include an opening in said outer surface of said spring support.

* * * * *